United States Patent
Shu

(10) Patent No.: US 9,602,971 B2
(45) Date of Patent: Mar. 21, 2017

(54) CONTROLLING DYNAMICALLY-CHANGING TRAFFIC LOAD OF WHITESPACE DEVICES FOR DATABASE ACCESS

(75) Inventor: Kodo Shu, Kawasaki (JP)

(73) Assignee: Nokia Technologies Oy, Espoo (FI)

( * ) Notice: Subject to any disclaimer, the term of this patent is extended or adjusted under 35 U.S.C. 154(b) by 871 days.

(21) Appl. No.: 12/759,932

(22) Filed: Apr. 14, 2010

(65) Prior Publication Data

US 2011/0258214 A1 Oct. 20, 2011

(51) Int. Cl.
*G06F 17/30* (2006.01)
*H04W 4/02* (2009.01)
(Continued)

(52) U.S. Cl.
CPC ......... *H04W 4/023* (2013.01); *H04L 41/0893* (2013.01); *H04W 4/001* (2013.01);
(Continued)

(58) Field of Classification Search
CPC ......... G06F 21/6218; G06F 2221/2111; H04L 65/80; H04L 67/16; H04L 1/0026;
(Continued)

(56) References Cited

U.S. PATENT DOCUMENTS 6,463,307 B1 * 10/2002 Larsson et al. ............... 455/574
7,657,946 B2 * 2/2010 Yan ..................... G06F 21/6218
726/28

(Continued)

FOREIGN PATENT DOCUMENTS

GB 2 411 793 A 9/2005

OTHER PUBLICATIONS

"Find Free TV White Spaces Channels Anywhere in the USA", http://www.showmywhitespace.com/, Jun. 11, 2012, 2 pgs.

*Primary Examiner* — Sangwoo Ahn
(74) *Attorney, Agent, or Firm* — Harrington & Smith

(57) ABSTRACT

A central node/database receives from each $m^{th}$ one of a plurality of M user devices at least one of geographic location information of the $m^{th}$ user device and type information of the $m^{th}$ user device. The node/database registers the M user devices to different groups according to at least one of location criteria based on the received geographic location information and type criteria based on the received type information. Then the node/database sends to each $m^{th}$ one of the plurality of M user devices a set of parameters that define a periodic time window that is specific to the group to which the $m^{th}$ user device is registered. The time window restricts times at which the $m^{th}$ user device can access a data source of spectrum use information. Balancing the number of user devices among the groups, spreads database accesses in time and overloads are less frequent and less severe.

20 Claims, 7 Drawing Sheets

(51) Int. Cl.
  *H04L 12/24* (2006.01)
  *H04W 4/00* (2009.01)
  *H04W 4/04* (2009.01)
  *H04W 4/08* (2009.01)
  *H04W 8/02* (2009.01)

(52) U.S. Cl.
  CPC .............. *H04W 4/02* (2013.01); *H04W 4/043* (2013.01); *H04W 4/08* (2013.01); *H04W 8/02* (2013.01)

(58) Field of Classification Search
  CPC ..... H04L 47/14; H04L 5/0016; H04L 5/0023; H04N 21/2668; Y02B 60/142; Y02B 60/144; Y02B 60/167; H04W 72/04; H04W 36/06; H04W 72/005; H04W 28/16; H04W 72/0453
  USPC .......................................... 707/688, 694, 787
  See application file for complete search history.

(56) References Cited

U.S. PATENT DOCUMENTS

| | | | |
|---|---|---|---|
| 7,903,540 B2 * | 3/2011 | Shousterman et al. | 370/216 |
| 8,135,718 B1 * | 3/2012 | Das | G06F 17/30979 707/748 |
| 2004/0107408 A1 * | 6/2004 | Sano et al. | 716/2 |
| 2005/0197118 A1 * | 9/2005 | Mitchell | 455/434 |
| 2007/0021141 A1 * | 1/2007 | Yokota et al. | 455/550.1 |
| 2007/0237092 A1 | 10/2007 | Balachandran et al. | 370/254 |
| 2008/0089279 A1 * | 4/2008 | Hu et al. | 370/329 |
| 2009/0055929 A1 * | 2/2009 | Lee et al. | 726/23 |
| 2009/0196180 A1 | 8/2009 | Bahl et al. | 370/235 |
| 2010/0057485 A1 * | 3/2010 | Luft | 705/1 |
| 2011/0258214 A1 * | 10/2011 | Shu | 707/769 |

* cited by examiner

CONTROLLING DYNAMICALLY-CHANGING TRAFFIC LOAD OF WHITESPACE DEVICES FOR DATABASE ACCESS

TECHNICAL FIELD

The teachings herein relate generally to wireless networks and devices operating among such networks, and are particularly related to cognitive radios/whitespace devices that operate opportunistically using portions of radio spectrum not currently in use by networks that have designated radio resources and balancing the traffic load imposed by such devices.

BACKGROUND

The following abbreviations are used within the description below:
CCC cognitive control channel
CR cognitive radio
CRN cognitive radio network
DB database
E-UTRAN evolved UTRAN
FCC federal communications commission (US)
GERAN GSM/EDGE radio access network
GSM global system for mobile telecommunications
ISM industrial, scientific and medical (originally reserved for these uses)
QoS quality of service
UTRAN universal terrestrial radio access network
WS white space Traditionally radio spectrum is divided between different radio systems in a manner that strictly allocates a specific band to a specific system. This strict allocation will be changing to a more flexible spectrum utilization at least in some frequency bands in the future. Primary users are those to whom the specific frequency band is licensed such as those operating in hierarchical or other such formal networks (for example, cellular networks such as GSM, GERAN, UTRAN and E-UTRAN; broadcast systems such as television systems; and satellite systems such as GPS and IRIDIUM). Cognitive networks exploit unused time-frequency slots in the radio spectrum in an opportunistic manner. Ad-hoc networks such as WLAN, Bluetooth, ANT and Zigbee for example operate in the ISM band and are therefore not licensed, and not cognitive networks.

Cognitive networks exploit spectrum 'holes' within the frequency bandwidth opportunistically. Secondary users are those operating in cognitive networks, outside the structured networks. Since essentially almost all spectrum in crowded areas that is usable by mobile terminals is allocated to some formal network or another, the secondary users find and utilize portions of the existing formal networks' spectrum in an opportunistic manner. Since finding these spectrum holes is power intensive to a mobile device (for example, spectrum sensing by cyclostationary feature detection) and the holes change dynamically based largely on primary user activity, there is some research into coordinating the spectrum sensing function which finds these holes among various secondary users, and also for sharing the whole of the spectrum sensing results among them. Secondary users are generally referred to as cognitive radios CRs or whitespace WS devices. Note that an individual mobile device may operate as a primary user on a licensed band and simultaneously as a secondary user in the whitespaces; the two are not mutually exclusive to a generic device. Development of cognitive radio systems is at an early stage, and some cognitive radio systems may have a specific spectrum band allocated (for a cognitive pilot channel and/or a cognitive control radio, which are more generically termed cognitive control channels CCCs), and may even have some central node.

Some frequency bands are active globally (e.g., cellular bands for globally adopted protocols), which eases burdens on wireless equipment manufacturers but may lead to a particular band being highly active in one country but largely unused in another. Regulatory bodies are beginning to consider how this inefficiently used spectrum may be better put to use. For example, in the United States the FCC has opened the former television bands, named White Spaces, for unlicensed devices which can use that spectrum without interfering with licensed users. Other countries are expected to also allow unlicensed secondary users on certain licensed bands. However, the secondary users need to be able to avoid interfering with the primary (licensed) users, when and where such users are active. This means that secondary users need to detect the primary user.

Very early visions of cognitive radio considered that secondary users would discover the primary users, for whom they must avoid interfering, through spectrum sensing. Other options include having information of the primary users in the area (e.g., network operators and bands/frequencies they occupy) stored in a database DB and broadcast on cognitive pilot channels or accessed by other means such as requesting from that database of distributed by access points. For example, the FCC has a database of TV signals and locations where wireless microphones are being used (such as stadiums, churches and entertainment venues). Current systems using the white spaces as unlicensed users are expected to access to the database relevant to their own geo-location, and also to scan for possible interferences. See for example http://www.showmywhitespace.com/, a WS database showing channels based on a specified address.

Whether or not a particular WS device contributes to the DB its own spectrum sensing results, all WS devices would need to be able to access such a database which accumulates spectrum use information (from WS devices, and/or from access nodes controlling the primary users, etc.). In the DB model the WS device would need to maintain in its own memory the latest information of the DB so as to transmit at the proper frequency bands and times according to the most recent DB information.

A problem arises in the DB model in that the amount of servers and communication capacity of the database is dimensioned based on predictions of how many WS devices might potentially be querying the database simultaneously. However, the traffic load incurred from these queries could be very dynamic in time, and could easily exceed the processing capacity of the database (a DB overload issue). Such a DB overload may substantially increase the risk of server/DB failure, or at least lead to substantial delays in the WS devices obtaining the relevant spectrum use data. Too much of a delay and this time sensitive data is no longer valid. At other times it is expected that the traffic load will be far below the processing capacity of the DB (a DB over-provisioning or over-dimensioning issue). This implies a higher than needed capital investment in the DB infrastructure, which represents less than optimum cost-benefit ratio for database providers.

FIG. 1 illustrates conceptually the overload versus over-dimension issues becoming dominant at different times based on varying traffic load. Any load below the DB capacity represents unused infrastructure, while any load above the DB capacity represents delaying the information to the WS devices and potential DB failure. Exemplary embodiments that are detailed below aid in smoothing those variations in overload versus under load, enabling at least DB providers to more efficiently meet the needs of WS devices.

SUMMARY

In a first aspect thereof the exemplary embodiments of this invention provide an apparatus comprising at least one processor and at least one memory including computer program code. In this first aspect the at least one memory and the computer program code are configured, with the at least one processor, to cause the apparatus at least to: receive from each $m^{th}$ one of a plurality of M user devices at least one of geographic location information of the $m^{th}$ user device and type information of the $m^{th}$ user device, in which M is an integer greater than one; register the M user devices to different groups according to at least one of location criteria based on the received geographic location information and type criteria based on the received type information; and send to each $m^{th}$ one of the plurality of M user devices a set of parameters that define a periodic time window that is specific to the group to which the $m^{th}$ user device is registered. The time window restricts times at which the $m^{th}$ user device can access a data source of spectrum use information.

In a second aspect thereof the exemplary embodiments of this invention provide a method comprising: receiving from each $m^{th}$ one of a plurality of M user devices at least one of geographic location information of the $m^{th}$ user device and type information of the $m^{th}$ user device, in which M is an integer greater than one; registering the M user devices to different groups according to at least one of location criteria based on the received geographic location information and type criteria based on the received type information; and sending to each $m^{th}$ one of the plurality of M user devices a set of parameters that define a periodic time window that is specific to the group to which the $m^{th}$ user device is registered; in which the time window restricts times at which the $m^{th}$ user device can access a data source of spectrum use information.

In a third aspect thereof the exemplary embodiments of this invention provide a memory storing a program of computer readable instructions that when executed by at least one processor result in actions comprising: receiving from each $m^{th}$ one of a plurality of M user devices at least one of geographic location information of the $m^{th}$ user device and type information of the $m^{th}$ user device, in which M is an integer greater than one; registering the M user devices to different groups according to at least one of location criteria based on the received geographic location information and type criteria based on the received type information; and sending to each $m^{th}$ one of the plurality of M user devices a set of parameters that define a periodic time window that is specific to the group to which the $m^{th}$ user device is registered; in which the time window restricts times at which the $m^{th}$ user device can access a data source of spectrum use information.

In a fourth aspect thereof the exemplary embodiments of this invention provide an apparatus comprising at least one processor and at least one memory including computer program code. In this fourth aspect the at least one memory and the computer program code are configured, with the at least one processor, to cause the apparatus at least to: provide to a network node at least one of geographic location information of the apparatus and type of the apparatus; in response to the providing, receive a set of parameters that define a periodic time window; and use the periodic time window to restrict times at which a data source is accessed, the data source providing spectrum use information for at least the geographic location of the apparatus.

In a fifth aspect thereof the exemplary embodiments of this invention provide a method comprising: providing to a network node at least one of geographic location information of the apparatus and type of an apparatus; in response to the providing, receiving a set of parameters that define a periodic time window; and using the periodic time window to restrict times at which the apparatus accesses a data source, the data source providing spectrum use information for at least the geographic location of the apparatus.

In a sixth aspect thereof the exemplary embodiments of this invention provide a memory storing a program of computer readable instructions that when executed by at least one processor result in actions comprising: providing to a network node at least one of geographic location information of an apparatus and type of the apparatus; in response to the providing, receiving a set of parameters that define a periodic time window; and using the periodic time window to restrict times at which the apparatus accesses a data source, the data source providing spectrum use information for at least the geographic location of the apparatus These and other aspects are detailed more particularly below.

BRIEF DESCRIPTION OF THE DRAWINGS

The foregoing and other aspects of these teachings are made more evident in the following Detailed Description, when read in conjunction with the attached Drawing Figures.

DETAILED DESCRIPTION

Figure 1:
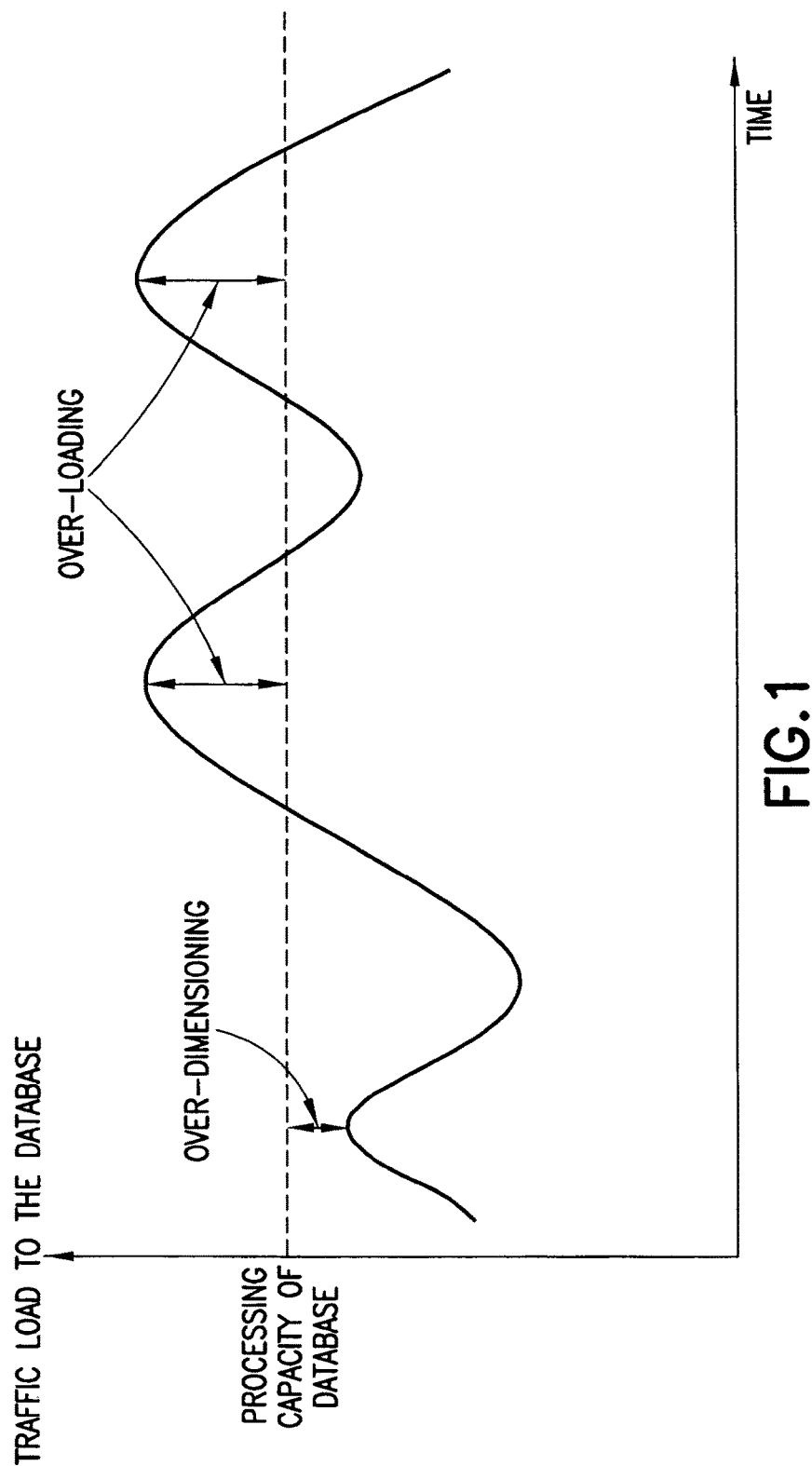
FIG. 1 is a chart of traffic load accessing a database over time showing wide variance between over-dimensioning the database in periods of low load and overloading the database in times of high load.

Further to the problem formulated above, embodiments of this invention provide a way to stagger the times at which different WS devices access a database that stores the spectrum use information. The WS devices are grouped together according to one or more criteria that will balance out the number of WS devices among the groups. Each group then is given a time window during which they can access the database to obtain spectrum use information. Each WS device accesses the DB during its group time window and refrains from accessing it at all other times. Each group has a different time window that does not overlap with the time window of any other group, and these time windows are recurring and periodic for repeated DB access. This tends to smooth the variations between over-provisioning and over-dimensioning shown by example at FIG. 1. The number of devices per group will not always be perfectly balanced, because the criteria used to define the groups limits which WS devices may be placed in which groups, but they are balanced to be substantially equal, given the constraint of the grouping criteria.

The database may store as the spectrum use information the spectrum sensing results which certain of the whitespace devices may sense and contribute to the database in real time, such as for example where different WS devices each sense only different frequency slices that together provide a comprehensive view of the overall spectrum in which the holes are sought. Additionally or alternatively, the database may have information on primary user activity, which can be contributed by hierarchical networks/access nodes, by the primary users themselves, or by other whitespace devices which sense primary user activity. The database may additionally include other information that indicates what portions of the frequency spectrum are in use at what times, such as for example channel use lists associated with geographic locations where those channels are or are not in use.

If there is a database then access to it also includes access to the channel over which the database is reached, with provisions for communication propagation delays built into the time windows themselves in certain exemplary embodiments. But these teachings are also readily extended to the case where there is no centralized database but rather only a cognitive control channel CCC over which the various contributors (WS devices or others) transmit their own spectrum sensing information. In these embodiments, the time window is the time during which the group is allowed to transmit on that CCC, and they each listen to transmissions from WS devices of other groups at times outside their own group's window. Such non-database embodiments may still include some centralized node which undertakes the function of registering or otherwise assigning the various WS devices to the different groups. That centralized node may be a WS device itself if there is no other node dedicated to that functionality in the region.

It is expected that many if not all WS devices will generally have the capability to determine their own geographic location, such as for example by a GPS receiver and positioning data received thereon, triangulating among network access nodes or other transmitters of known and fixed location; interpolating position based on change in received signal strength over time, an inertial system, or by some other position determining means. WS devices are also assumed to include means, such as for example a radio transceiver, for accessing a DB that stores spectrum sensing information or a CCC that carries spectrum sensing information in real time. And at least some of the WS devices are expected to include means for sensing at least portions of the overall/wideband frequency spectrum, such as for example a radio receiver and at least one processor for discriminating at least primary user transmissions from frequency holes.

In an embodiment, the central node, which may or may not be a server storing the database or controlling access to it, first receives from each of the WS user devices certain information which it uses for the grouping. In an exemplary embodiment the central node receives from each of a plurality of WS user devices either or both of the WS device's geographic location information and information about what type of device is the reporting WS device. Generally, consider that there are M whitespace user devices involved, in which M is an integer greater than one and the individual WS devices are indexed as m=1, 2, . . . M. Some WS devices may report only geographic location information, some may only report device type, and some may report both location and type information, depending on the reporting WS device's individual capability and the corresponding regulatory requirements.

The central node registers the M user devices to different groups that received information. The grouping is therefore according to a location criteria (based on the received geographic location information), according to a type criteria (based on the received type information), or according to both criteria. Here, registering simply means storing an association of the $m^{th}$ WS device with the $n^{th}$ group to which it belongs (assuming a total of N groups indexed as n=1, 2, . . . N).

Figure 2:
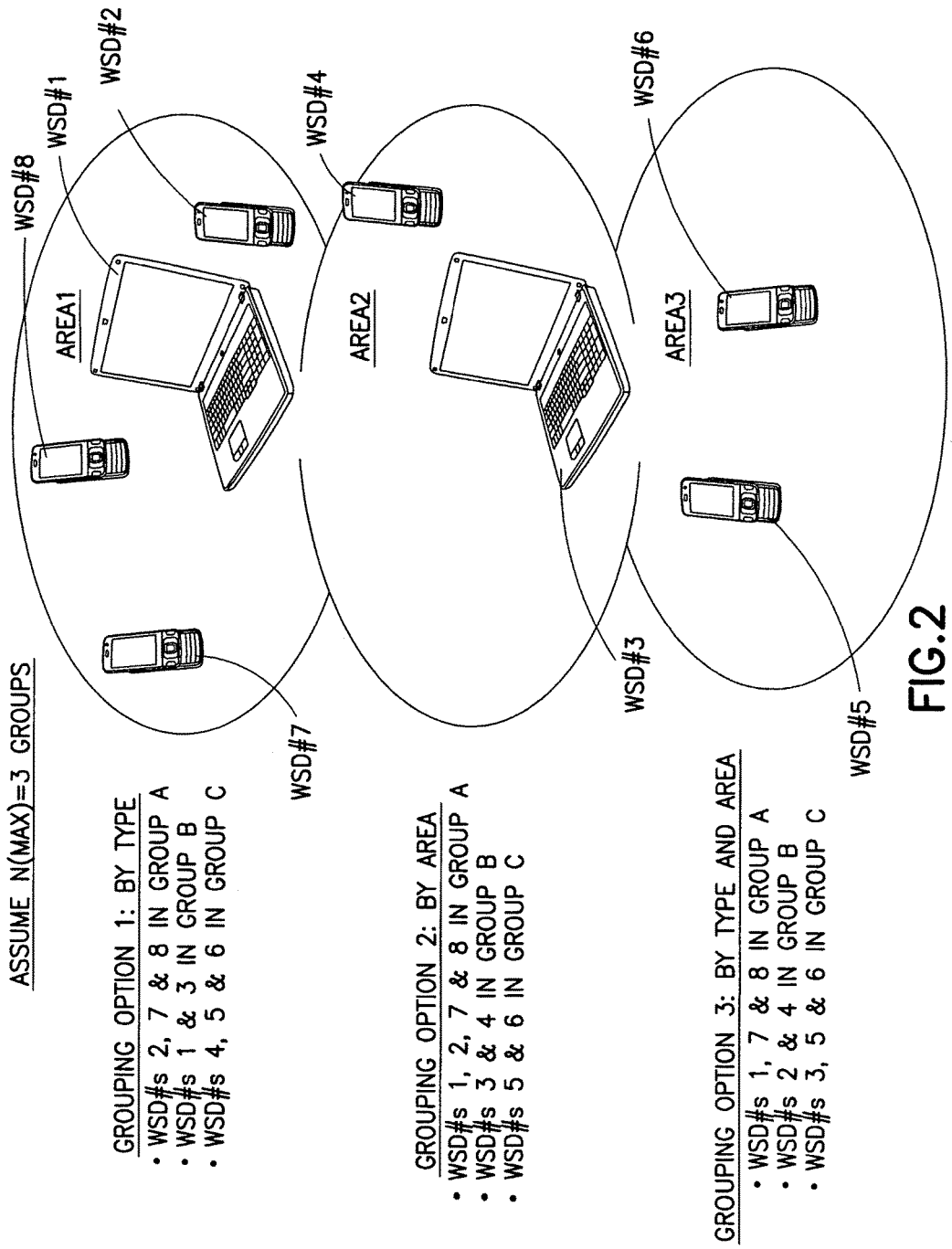
FIG. 2 is a schematic diagram of eight whitespace devices and three different ways to group them for spreading database access traffic load according to exemplary embodiments of the invention.

FIG. 2 illustrates an example of eight WS devices numbered WSD #1 through #8, grouped three different ways. These eight WS devices fall into two types (mobile terminal and laptop computer, differentiated in type by the extent of their mobility such as for example fixed or mobile) and three geographic areas #1 through #3. Grouping option 1 is according to device type: WS devices 2, 7 and 8 are put into group A; WS devices 1 and 3 are put into group B; and WS devices 4, 5 and 6 are put into group C. This is balanced because, given the sorting/grouping criteria of device type, the most equal balance is achieved; there is at most a difference of one device among the number of WS devices registered to any pair of the N=3 groups.

Grouping option 2 is according to device location: WS devices 1, 2, 7 and 8 are put into group A; WS devices 3 and 4 are put into group B; and WS devices 5 and 6 are put into group C. This is balanced if in fact the central node does not know the device type of at least WS device 1, because, given the sorting/grouping criteria of only device location, the most equal balance is achieved. This most equal balance given the grouping criteria is that there is at most a difference of two devices among the number of WS devices registered to any pair of the N=3 groups. If in fact device type were known for WS device #1, then that WS device can be moved to group A as with grouping option 1 to make the balance +/− one device across any pair of groups.

Grouping option 3 is according to both device location and device type criteria: WS devices 1, 7 and 8 are put into group A; WS devices 2 and 4 are put into group B; and WS devices 3, 5 and 6 are put into group C. This is balanced in that there is no way to divide eight WS devices among three groups and have less than a difference of one device in the number of devices across any pair of groups.

The central node may have different information from the different WS devices. Regardless, the central node uses whatever information it receives, and chooses the grouping criteria to use and registers the WS devices to the different groups so as to result in the most equal split of WS devices among the different groups. Generally, balancing each of the different groups means that, within the constraints imposed by the grouping criteria (which are limited by what information the various WS devices report), the WS devices are registered to as to result in substantially an equal number of WS user devices in each of the N groups. As with the example of grouping option 2 above, since only location area information was known, the grouping criteria could only be location and the most balanced registration of WS devices resulted in a difference of two WS devices across any pair of the groups. Since this is the most balanced given the grouping constraint, it is substantially an equal number of devices in each group.

Now that the groups are established and the M WS devices are registered, each to one and only one of the N groups, the central node then sends to each of the M WS user devices a set of parameters that define a periodic time window. Each of these time windows is group-specific for the group to which is registered the WS device to which the parameter set is sent. These time windows each restricts times, at which the WS devices that are registered to the group associated with the group-specific time window, can access the source of the spectrum use information, whether that source be a server/database or a CCC. For at least the DB implementation this time window represents a time during which the registered WS devices are allowed to send a query to the DB for spectrum usage information.

Specifically, in an exemplary embodiment the set of parameters includes: an initial time t_initial; a length of the time window $\Delta T$; and a silence interval T between consecutive time windows. In an exemplary embodiment only the initial time t_initial is group-specific. The initial time indicates the starting time-instance for the WS devices to send queries. The querying time-window indicates a time period during which the WS devices within the group are allowed to query the database. The silence-timer indicates a time period during which the WS devices within the group are not to query the database.

Figure 3:
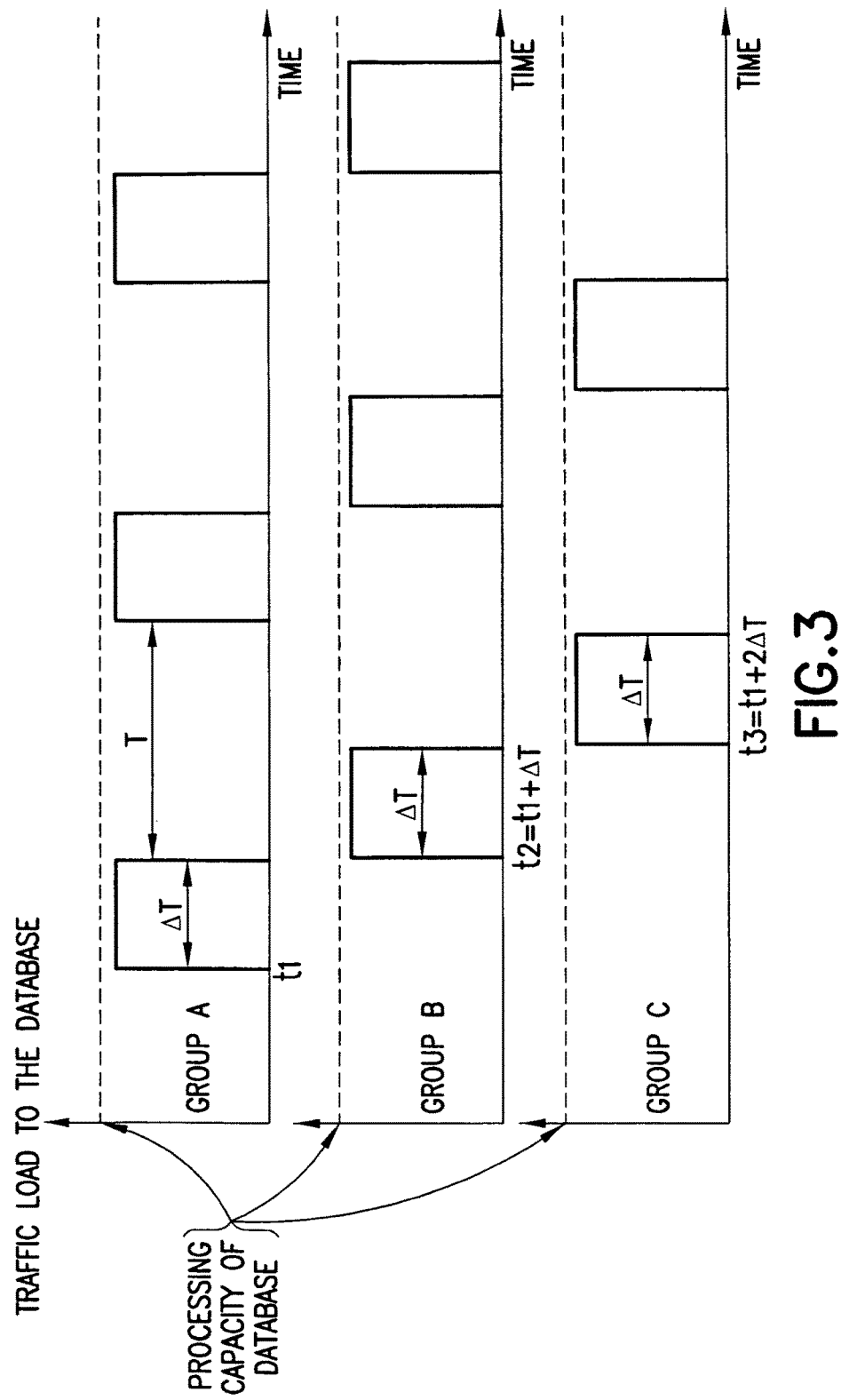
FIG. 3 is a timing diagram showing different time windows for the three different groups of FIG. 2 to access the database of spectrum use information according to an exemplary embodiment of the invention.

In an exemplary embodiment, when the WS devices first register themselves or first send queries to the database, the central node/database replies to these queries or registration messages and also sends back these three parameter values (initial time, a time-window and a silence-timer) to the WS devices via signaling messages. The WS devices receive and store these time-values in their own local memories. The WS devices also initiate their own timer according to these values. The next time when the initial time is triggered at the WS device timer, the WS device sends a query to the database and also resets the initial time according to the querying time window and the silence-timer. An example of these values is shown at FIG. 3.

Assume for FIG. 3 that again there are N=3 groups, designated groups A, B and C. WS devices within group A are each given an initial time t1; WS devices within group B are each given an initial time t2; and WS devices within group C are each given an initial time t3. All WS devices of any group is also given a length of the time window $\Delta T$; and a silence interval T. Note that in this exemplary embodiment both $\Delta T$ and T are common among all groups, but in other embodiments they may differ. In the FIG. 3 example, the initial time for group C t3=t1+2$\Delta T$, and the initial time for group B t2=t1+$\Delta T$. At times between t1 and t1+$\Delta T$, WS devices in group A are allowed to send queries to the DB or to transmit their sensing results on the CCC (if no DB is present) while WS devices in groups B and C do not query the DB or transmit on the CCC. At the expiration of t1+$\Delta T$ begins t2, and at times between t2 and t2+t1+$\Delta T$, WS devices in group B are allowed to send queries to the DB or to transmit their sensing results on the CCC (if no DB is present) while WS devices in groups A and C do not query the DB or transmit on the CCC. And at the expiration of t2+t1+$\Delta T$ begins t3, so at times between t3 and t1+2$\Delta T$, WS devices in group C are allowed to send queries to the DB or to transmit their sensing results on the CCC (if no DB is present) while WS devices in groups A and B do not query the DB or transmit on the CCC. FIG. 3 shows the cycle repeating, so each group's time window is periodic.

During the normal operation, the central node/database registers newly entering WS devices to the appropriate group in order to keep balance (and also removes departing WS devices, such as those which have not queried the DB or transmitted on the CCC over two or some threshold number of time window cycles). The central node monitors if all groups are full of registered WS devices, and if there is further one or more WS devices that is not able to be registered to any group because all the possible groups are full, then the central node/database re-configures the processing capacity and begins the process again, re-registering at least some of the M WS devices and the additional not-previously registered WS device(s) to the different groups (again according to at least one of the location criteria and the type criteria, though in this re-registering it may use different criteria than the first time in order to get all WS devices registered and groups balanced).

In one exemplary embodiment, the central node/database first determines its processing capacity (for example, the amount of servers and communication capacity). The processing capacity could be based on the predictions of the number of WS devices potentially querying the database simultaneously. The central node/database then figures out several key parameters, including: maximum number of groups (N_max); querying time-window ($\Delta T$); silence-timer (T); and initial time (t_initial). The value for the initial time may be re-adjusted and fixed after determining the number of groups (detailed below).

As noted earlier, T, $\Delta T$ and t_initial are the parameter values to be assigned to each group. In an embodiment only t_initial is a group-specific parameter, which indicates the starting time-instance for the WS devices to send their database queries. In such an embodiment the same value of T and $\Delta T$ is used for all groups, and this embodiment is the one continued in the further discussion below without loss of generality. In other embodiments T and $\Delta T$ could also be group-specific.

This results in the updating frequency being given by $$\frac{1}{T + \Delta T},$$

which is based on which of the WS devices shall query the database periodically and update itself with the latest spectrum use information (for example, available channel list associated with the geographic locations as noted above). This is to satisfy certain jurisdictions that require a minimum updating frequency, for example the FCC in the United States currently requires daily updating and Ofcom in the UK currently requires updating every two hours.

The time period $\Delta T$ during which the WS devices shall query the database is useful since the queries from the WS devices may not reach the database in a completely simultaneous way due to the network jitters. The value for $\Delta T$ could be decided by the central node/database based on measurements of jitter and/or propagation delay and/or heuristic rules.

After obtaining the updating frequency $$\frac{1}{T + \Delta T}$$

and the time period ΔT, the central node/database can then derive the value of T, which is the time period during which the WS devices do not need or are not allowed to query the database.

Finally, N_max can be determined by using the following equation: N_max×ΔT≤T+ΔT. In the example at FIG. 3, T=2ΔT and N_max=3.

After knowing N_max as the upper limit, the central node/database can decide how many groups it wishes to establish and how many WS devices each group can include. As the WS devices within the same group can potentially query the database simultaneously, the number of WS devices within one group is directly related with the processing capacity of the database (for example, the amount of servers and communication capacity).

After determining the number of groups and the number of WS devices within one group, the central node/database can then fix the parameter t_initial for each group. For each group, the central node/database assigns three time-values related with querying: initial time (t_initial), a querying time-window (ΔT) and a silence-timer (T). Three different options for registering eight WS devices to three groups are shown at FIG. 2. When the WS devices first register themselves or first send queries to the database, the central node/database receives the detailed information (for example, fixed type or mobile type device, and geographic location) from the WS devices. Based on that received information, the central node/database can separate and register the WS devices into specific groups, according to either or both criteria, area-specific and type specific.

The central node/database replies queries or registration messages from the WS devices and also sends back the three parameter values (ΔT, T and t_initial) to the WS devices via signaling messages. By sending back different parameter values than those defining the window in which a query was received, the central node/database can change which group an individual WS device is registered. The WS devices receive the replies from the central node/database and stores these most recently received time-values (ΔT, T and t_initial) in its own local memory. The WS devices also initiate their own counting timers according to these most recently received values. Then when the initial time t_initial is triggered at the WS device, the WS device sends a query to the database and also resets its own initial time t_initial according to T and ΔT.

During the normal operation, the central node/database monitors if all groups are full of registered WS devices, and checks if there are any WS devices that are not able to be registered to a group due to the groups being full. If these conditions are satisfied, the central node/database concludes that its current processing capacity is not enough and starts to reconfigure if possible, such as for example by increasing the processing capacity (for example, by adding more servers or modems) and goes back to the start to re-register the WS devices to new groups.

In an exemplary embodiment the updating frequency for different WS devices may be different. For example, the portable-type WS devices, due to their mobility, may need faster updating than the fixed-type devices. So in an exemplary embodiment of the invention the group that includes portable or mobile type WS devices has its updating frequency adjusted. Two exemplary but non limiting options for this are presented.

In a first updating frequency adjustment option, a maximum moving speed of the portable/mobile-type WS devices is estimated, and the updating frequency $$\frac{1}{T + \Delta T}$$

is determined based at least in part on that estimated maximum speed. This is seen to be most practical for the case in which the portable/mobile WS devices can be considered to typically move at a walking speed, and so an estimate of maximum speed will be fairly accurate.

In a first updating frequency adjustment option, the WS devices in the portable/mobile type group report their (actual) moving speed to the central node/database via the signaling messages/queries noted above. This is seen to be relatively simple given the WS device's capability to obtain its own geographic location information. Specifically, once the WS device learns two geographic locations and the time it took the device to move between them, the WS device can at least roughly estimate/average its own speed. The central node/database can then determine the updating frequency $$\frac{1}{T + \Delta T}$$

for the group based on the maximum of the moving speeds reported by devices in that group.

By the above non-limiting examples, a technical effect of embodiments of the invention is the ability to control the dynamic traffic load so that the dynamic load could be balanced over time, smoothing the peaks and valleys of FIG. 1 by means of grouping and time windows per group. Another technical effect is the ability to control the traffic load according to the real processing capacity of the database, which will tend to reduce either or both of overload frequency or overload severity.

Figure 4:
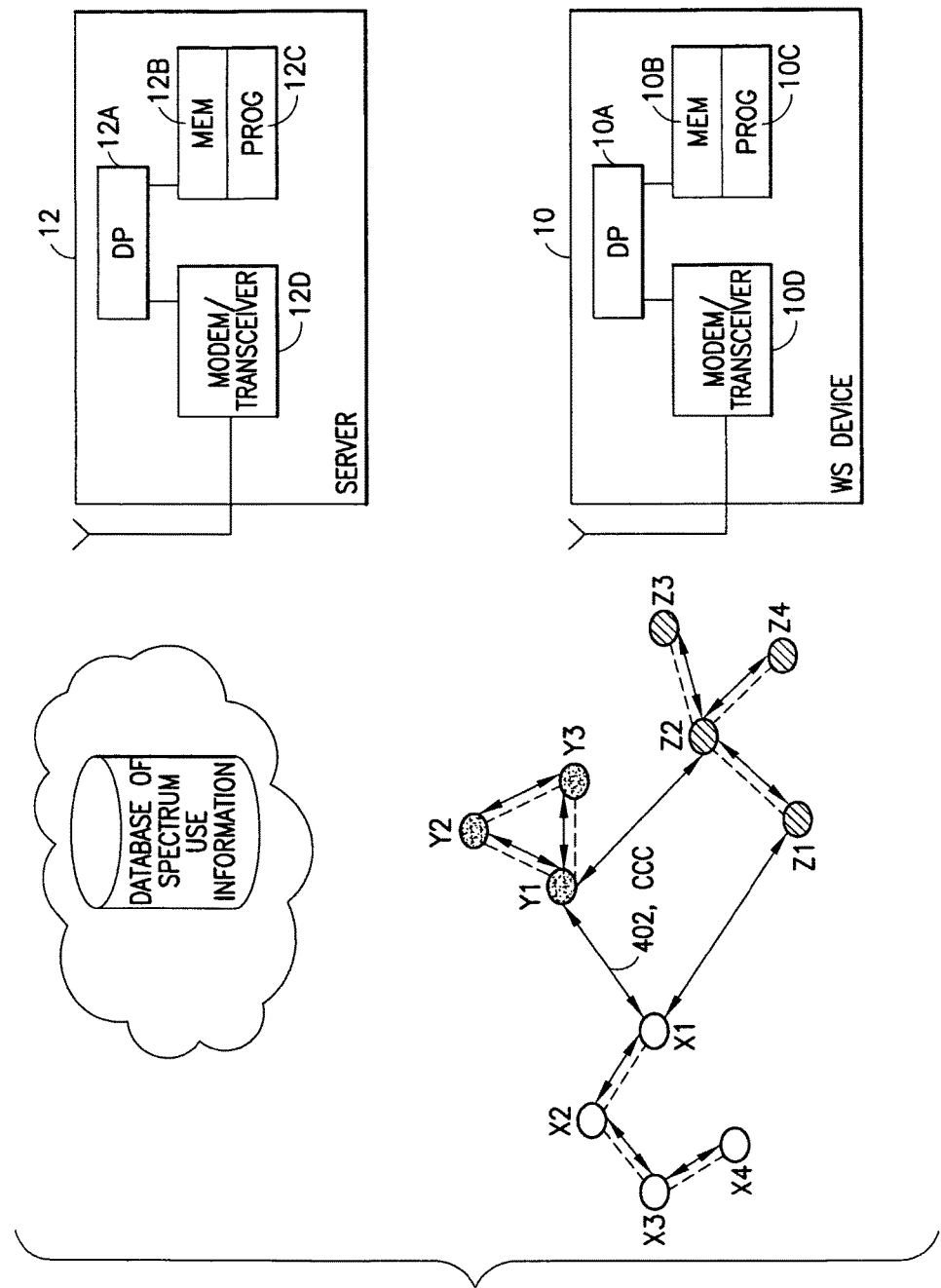
FIG. 4 is a schematic diagram showing three clusters of whitespace devices operating in three different cognitive networks all accessing spectrum use information, in a first case over a common cognitive control channel and in a second case from a common database, according to exemplary embodiments of the invention.

FIG. 4 illustrates an exemplary environment in which exemplary embodiments of the invention may be practiced. Dashed lines indicate device to device links over which user data is communicated over cognitive/opportunistic 'channels'; solid lines indicate a cognitive control channel CCC 402 that is used for either access to the DB or for directly sharing spectrum sensing results if no DB is in use in the area. At FIG. 4 there is a first cognitive radio network in which WS devices X1 through X4 exchange user data over the dashed line opportunistic channels, and a CCC 402 by which they access the DB of spectrum use information. That same CCC 402 is used by an adjacent cognitive radio network having WS devices Y1 through Y3, and is also in use by further cognitive radio network having WS devices Z1 through Z4. The CCC 402 also leads to the DB but lead lines from each of the eleven WS devices for that purpose are not specifically shown at FIG. 4.

FIG. 4 makes clear that a single DB can serve multiple WS devices and multiple cognitive radio networks that are not exchanging user data among themselves and which may not even be aware of one another's existence if far enough spaced from each other. For the DB implementation, only the central node/database needs to know all of the WS devices to access it. The central node/database need not put all the WS devices that operate in a single cognitive radio network (such as for example nodes X1 through X4) in the same group, and may for example put into a single group nodes X3, Z2, Z4 and Y1 as shown at FIG. 4 (assuming a common device-type criteria among them).

Also illustrated at FIG. 4 are schematic diagrams of a server 12 which may be considered in one embodiment as the central node/database, and a WS device 10. The server 12 includes at least one controller, such as a computer or a data processor (DP) 12A, at least one computer-readable memory medium embodied as a memory (MEM) 12B that stores a program of computer instructions (PROG) 12C and the spectrum use information, and a suitable modem, and possibly also a RF transceiver 12D for communication with the WS device 10 via one or more antennas if communicating directly. The WS device 10 includes at least one controller, such as a computer or a data processor (DP) 10A, at least one computer-readable memory medium embodied as a memory (MEM) 10B that stores a program of computer instructions (PROG) 10C, and a suitable modem/radio frequency (RF) transceiver 10D for bidirectional wireless communications with the server 12 via one or more antennas, either directly or via some intermediary radio node.

At least one of the PROGs 10C and 12C is assumed to include program instructions that, when executed by the associated DP, enable the device to operate in accordance with the exemplary embodiments of this invention, as detailed above. That is, the exemplary embodiments of this invention may be implemented at least in part by computer software executable by the DP 10A of the WS device 10 and/or by the DP 12A of the server 12, or by hardware, or by a combination of software and hardware (and firmware). The timers noted above for keeping track of the time windows and initial times may be inherent in the DP 10A, 12A, or may be running timers within a PROG 10C, 12C stored in the MEM 10B, 12B.

In general, the various embodiments of the WS device 10 of the mobile type can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Fixed type WS devices can include a laptop or desktop computer.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Figure 5:
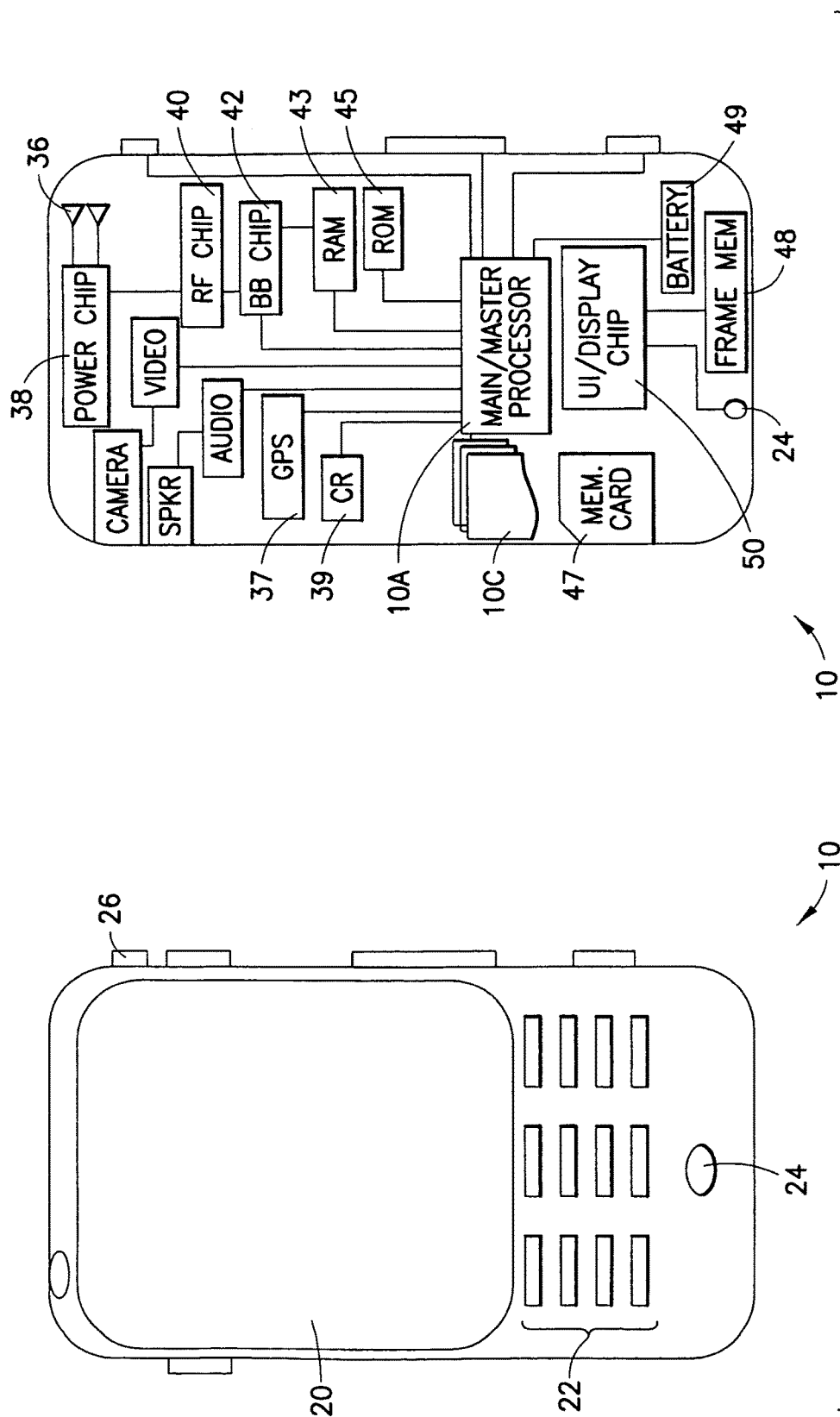
FIG. 5 is a plan and sectional view of a whitespace device embodied as a mobile user equipment UE according to an exemplary embodiment of the invention.

FIG. 5 illustrates further detail of an exemplary WS device embodied as a mobile terminal/user equipment in both plan view (left) and sectional view (right), and the invention may be embodied in one or some combination of those more function-specific components. At FIG. 5 the WS device 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary WS device 10 may have a camera 28 which is shown as being forward facing (e.g., for video calls) but may alternatively or additionally be rearward facing (for example, for capturing images and video for local storage). The camera 28 is controlled by a shutter actuator 30 and optionally by a zoom actuator 32 which may alternatively function as a volume adjustment for the speaker(s) 34 when the camera 28 is not in an active mode.

Within the sectional view of FIG. 5 are seen multiple transmit/receive antennas 36 that are typically used for cellular communication. The antennas 36 may be multi-band for use with other radios in the WS device. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and downconverts the signal for baseband processing. The baseband (BB) chip 42 detects the signal which is then converted to a bit-stream and finally decoded. Similar processing occurs in reverse for signals generated in the apparatus 10 and transmitted from it. For completeness there is also shown a camera 28, an image/video processor 44, a separate audio processor 46, speakers 34, microphone 24 and a frame memory 48 controlled by a user interface chip 50 to refresh the graphical display interface 20.

Certain embodiments of the WS device 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which the various programs 10C are stored. All of these components within the WS device 10 are normally powered by a portable power supply such as a battery 49.

The aforesaid processors 38, 40, 42, 44, 46, 50, if embodied as separate entities in a WS device 10 or server 12, may operate in a slave relationship to the main processor 10A, 12A, which may then be in a master relationship to them. Any or all of these various processors of FIG. 5 access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the server 12.

Note that the various chips (e.g., 38, 40, 42, etc.) that were described above may be combined into a fewer number than described and, in a most compact case, may all be embodied physically within a single chip.

Figure 6A:
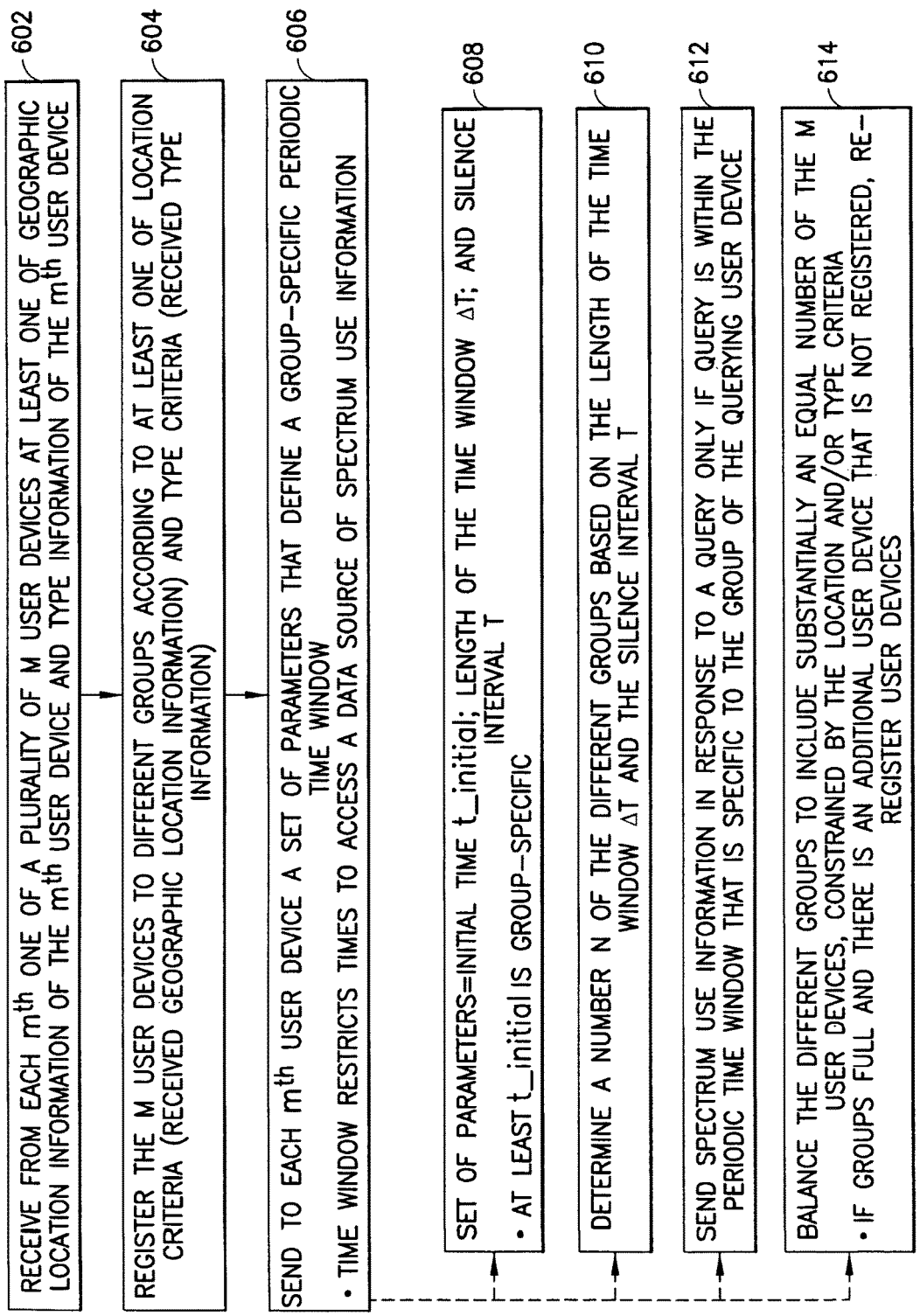
FIG. 6A is a schematic process flow diagram showing, for example from the perspective of the database at FIG. 4, operation of a method, and execution of computer executable software stored on a memory, according to an embodiment of the invention.

FIG. 6A is a logic flow diagram that illustrates the operation of a method, and a result of execution of computer program instructions, in accordance with the exemplary embodiments of this invention. Also FIG. 6A describes functionality of an apparatus such as the central node/database/server 12 according to an embodiment these teachings. In accordance with these exemplary embodiments at block 602 the apparatus receives from each $m^{th}$ one of a plurality of M user devices (for example, the WS devices) at least one of geographic location information of the m$^{th}$ user device and type information of the m$^{th}$ user device. M is an integer greater than one.

At block 604 the apparatus registers the M user devices to different groups according to at least one of location criteria (based on the received geographic location information) and type criteria (based on the received type information). And at block 606 the apparatus sends to each m$^{th}$ one of the plurality of M user devices a set of parameters that define a periodic time window that is specific to the group to which the m$^{th}$ user device is registered. The time window restricts times at which the m$^{th}$ user device can access a data source of spectrum use information.

Figure 6B:
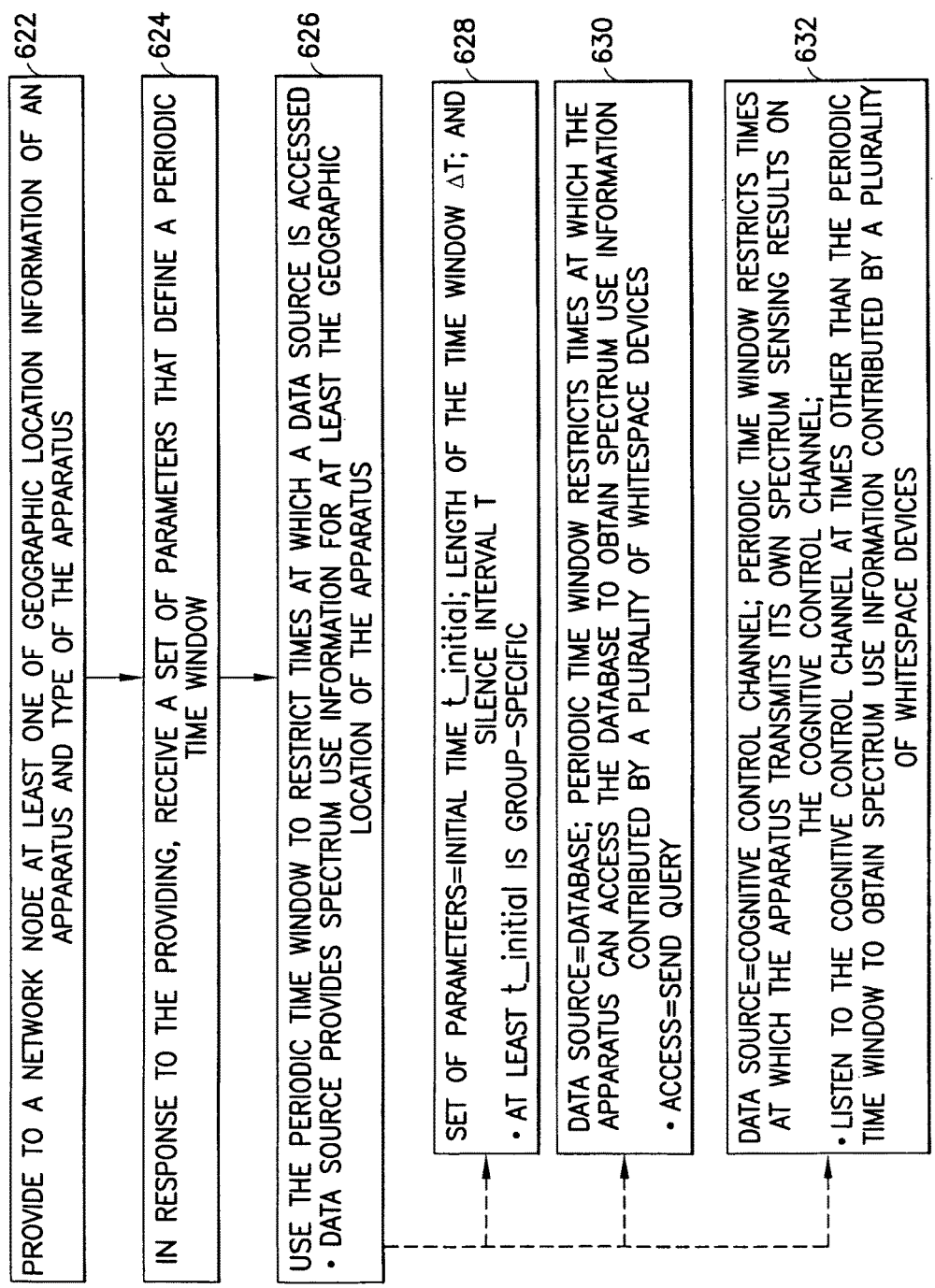
FIG. 6B is a schematic process flow diagram showing, for example from the perspective of the whitespace device of FIG. 5, operation of a method, and execution of computer executable software stored on a memory, according to an embodiment of the invention.

The dashed lines at FIGS. 6A-B indicate optional elements. At block 608 the set of parameters from block 606 comprises at least: initial time t_initial, length of the time window ΔT, and silence interval T between consecutive time windows, and at least the initial time t_initial that is sent to each m$^{th}$ user device is specific to the group to which the m$^{th}$ user device is registered. At block 610 the apparatus determines a number N of the different groups used at block 604 for registering the M user devices based at least on the length of the time window ΔT and the silence interval T. In the above example was shown N_max=3.

At block 612 the apparatus sends spectrum use information in response to a query from the m$^{th}$ user device only if said query is within the periodic time window that is specific to the group to which the m$^{th}$ user device is registered. In an embodiment block 612 follows block 606. And at block 614, when registering at block 604 the apparatus balances each of the different groups to include substantially an equal number of the M user devices, as constrained by at least one of the location criteria and the type criteria. If all of the M groups are full and there is an additional user device that is not registered to any of the M groups, the apparatus re-registers at least some of the M user devices and the additional user device to the different groups according to at least one of the location criteria and the type criteria.

FIG. 6B is a logic flow diagram that illustrates the operation of a method, and a result of execution of computer program instructions, in accordance with the exemplary embodiments of this invention. Also FIG. 6B describes functionality of an apparatus such as one of the WS devices according to an embodiment these teachings. In accordance with these exemplary embodiments at block 622 the apparatus provides to a network node (such as for example the central node, the server, or the database) at least one of geographic location information of the apparatus and type of the apparatus. At block 624 in response to the providing, the apparatus receives a set of parameters that define a periodic time window, and at block 626 uses the periodic time window to restrict times at which a data source is accessed. The data source provides spectrum use information for at least the geographic location of the apparatus.

At block 628 the received set of parameters comprises at least: initial time t_initial, length of the time window ΔT, and silence interval T between consecutive time windows. At block 630 the data source is a database, and the periodic time window restricts times at which the apparatus can access the database to obtain spectrum use information contributed by a plurality of whitespace devices. In this embodiment the database accesses are queries sent to the database for the spectrum use information.

The embodiment in which there is no database storing the spectrum use information is noted at block 632, in which the data source is a cognitive control channel, and the periodic time window restricts times at which the apparatus transmits its own spectrum sensing results on the cognitive control channel. In this embodiment the apparatus listens to the cognitive control channel at times other than the periodic time window to obtain the spectrum use information that is transmitted/contributed by a plurality of whitespace devices.

The various blocks shown in FIGS. 6A and 6B may be viewed as method steps, and/or as operations that result from operation of computer program code, and/or as a plurality of coupled logic circuit elements constructed to carry out the associated function(s).

In general, the various embodiments may be implemented in hardware or special purpose circuits, software (computer readable instructions embodied on a computer readable medium), logic or any combination thereof. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. FIGS. 6A and 6B may also represent specific circuit functions of an integrated circuit or chip.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

I claim:

1. An apparatus comprising:
   at least one processor;
   at least one memory including computer program code;
   the at least one memory and the computer program code configured, with the at least one processor, to cause the apparatus at least to:
   receive at least one geographic location information and device type information from a plurality of user devices using a communication frequency bandwidth;
   register the plurality of user devices to different groups according to at least one of location criteria based on the received geographic location information and device type criteria based on the received device type information; and
   send to at least one user device of the plurality of user devices a set of parameters that define a periodic time window that is specific to the group to which the at least one user device is registered; in which the time window restricts times at which the at least one user device can access a data source of spectrum use information related to use of the communication frequency bandwidth, wherein the data source comprises a white space database comprising information on primary users that must not be interfered.

2. The apparatus according to claim 1, in which the set of parameters comprises at least:
   initial time t_initial, length of the time window ΔT, and silence interval T between consecutive time windows;
   in which at least the initial time t_initial sent to each m$^{th}$ user device is specific to the group to which the at least one user device is registered.

3. The apparatus according to claim 2, in which the at least one memory and the computer program code are configured, with the at least one processor, to cause the apparatus at least further to:
 determine a number N of the different groups into which to register the plurality of user devices based at least on the length of the time window ΔT and the silence interval T.

4. The apparatus according to claim 1, in which the at least one memory and the computer program code are configured, with the at least one processor, to cause the apparatus at least further to:
 send spectrum use information in response to a query from the at least one user device only if said query is within the periodic time window that is specific to the group to which the at least one user device is registered;
 in which the apparatus comprises at least one server having a memory storing the spectrum use information which is received from at least some of the plurality of user devices.

5. The apparatus according to claim 1, in which registering the plurality of user devices to the different groups comprises determining a number N of different groups into which to register the plurality of user devices and balancing each of the N different groups to include substantially an equal number of the plurality of user devices as constrained by at least one of the location criteria and the device type criteria.

6. The apparatus according to claim 5, in which the at least one memory and the computer program code are configured, with the at least one processor, to cause the apparatus at least further to:
 in response to determining that all of the N different groups are full and there is an additional user device that is not registered to any of the N different groups, re-register at least some of the plurality of user devices and the additional user device to the N different groups according to at least one of the location criteria and the device type criteria.

7. A method comprising:
 receiving at an apparatus at least one geographic location information and device type information from a plurality of user devices using a communication frequency bandwidth;
 the apparatus registering the plurality of user devices to different groups according to at least one of location criteria based on the received geographic location information and device type criteria based on the received device type information; and
 the apparatus sending to at least one user device of the plurality of user devices a set of parameters that define a periodic time window that is specific to the group to which the at least one user device is registered; in which the time window restricts times at which the at least one user device can access a data source of spectrum use information related to use of the communication frequency bandwidth, wherein the data source comprises a white space database comprising information on primary users that must not be interfered.

8. The method according to claim 7, in which the set of parameters comprises at least:
 initial time t_initial, length of the time window ΔT, and silence interval T between consecutive time windows;
 in which at least the initial time t_initial sent to each $m^{th}$ user device is specific to the group to which the at least one user device is registered.

9. The method according to claim 8, the method further comprising:
 determining a number N of the different groups into which to register the plurality of user devices based at least on the length of the time window ΔT and the silence interval T.

10. The method according to claim 7, further comprising:
 sending spectrum use information in response to a query from the at least one user device only if said query is within the periodic time window that is specific to the group to which the at least one user device is registered;
 in which the apparatus comprises at least one server having a memory storing the spectrum use information which is received from at least some of the plurality of user devices.

11. The method according to claim 7, in which registering the plurality of user devices to the different groups comprises determining a number N of different groups into which to register the plurality of user devices and balancing each of the different groups to include substantially an equal number of the plurality of user devices as constrained by at least one of the location criteria and the device type criteria.

12. The method according to claim 11, further comprising:
 in response to determining that all of the N different groups are full and there is an additional user device that is not registered to any of the N different groups, re-registering at least some of the plurality of user devices and the additional user device to the different groups according to at least one of the location criteria and the device type criteria.

13. A memory storing a program of computer readable instructions that when executed by at least one processor result in actions comprising:
 receiving at least one geographic location information and device type information from a plurality of user devices using a communication frequency bandwidth;
 registering the plurality of user devices to different groups according to at least one of location criteria based on the received geographic location information and device type criteria based on the received device type information; and
 sending to at least one user device of the plurality of user devices a set of parameters that define a periodic time window that is specific to the group to which the at least one user device is registered; in which the time window restricts times at which the at least one user device can access a data source of spectrum use information related to use of the communication frequency bandwidth, wherein the data source comprises a white space database comprising information on primary users that must not be interfered.

14. An apparatus comprising:
 at least one processor;
 at least one memory including computer program code;
 the at least one memory and the computer program code configured, with the at least one processor, to cause the apparatus at least to:
 provide to a network node at least one of geographic location information and device type information of the apparatus using a communication frequency bandwidth;
 in response to the providing, receive a set of parameters that define a periodic time window that is specific to a group to which the apparatus is registered, wherein the apparatus is registered to the group by the network node according to at least one of location criteria based on the provided geographic location information and device type criteria based on the provided device type information; and use the periodic time window to restrict times at which a data source is accessed, the data source providing spectrum use information related to use of the communication frequency bandwidth, wherein the data source comprises a white space database comprising information on primary users that must not be interfered.

15. The apparatus according to claim 14, in which the received set of parameters comprises at least: initial time t_initial, length of the time window ΔT, and silence interval T between consecutive time windows.

16. The apparatus according to claim 14, in which the data source comprises a database, and the periodic time window restricts times at which the apparatus can access the database to obtain spectrum use information contributed by a plurality of whitespace devices.

17. The apparatus according to claim 16, in which the apparatus accesses the database to obtain the spectrum use information by sending to the database a query for the spectrum use information.

18. The apparatus according to claim 14, in which the data source comprises a cognitive control channel, and the periodic time window restricts times at which the apparatus transmits its own spectrum sensing results on the cognitive control channel;

and in which the memory and the computer program code are configured with the at least one processor to further cause the apparatus to listen to the cognitive control channel at times other than the periodic time window to obtain spectrum use information contributed by a plurality of whitespace devices.

19. A method comprising:

an apparatus providing to a network node at least one of geographic location information of the apparatus and device type information of the apparatus using a communication frequency bandwidth;

in response to the providing, the apparatus receiving a set of parameters that define a periodic time window that is specific to a group to which the apparatus is registered, wherein the apparatus is registered to the group by the network node according to at least one of location criteria based on the provided geographic location information and device type criteria based on the provided device type information; and the apparatus using the periodic time window to restrict times at which the apparatus accesses a data source, the data source providing spectrum use information related to use of the communication frequency bandwidth, wherein the data source comprises a white space database comprising information on primary users that must not be interfered.

20. The method according to claim 19, in which the set of parameters comprises at least: initial time t_initial, length of the time window ΔT, and silence interval T between consecutive time windows.

* * * * *